(12) United States Patent
Zasowski et al.

(10) Patent No.: US 9,514,583 B2
(45) Date of Patent: Dec. 6, 2016

(54) CONTROLLER FOR A DOOR OPERATOR

(71) Applicant: Yale Security, Inc., Monroe, NC (US)

(72) Inventors: Peter Zasowski, Yantis, TX (US);
Dustin Lawhon, Lilesville, NC (US);
Kurt Dietrich, Huntersville, NC (US);
Tommy G. McNally, II, Indian Trail, NC (US)

(73) Assignee: YALE SECURITY INC., Monroe, NC (US)

( * ) Notice: Subject to any disclaimer, the term of this patent is extended or adjusted under 35 U.S.C. 154(b) by 0 days.

(21) Appl. No.: 14/709,787

(22) Filed: May 12, 2015

(65) Prior Publication Data

US 2015/0262438 A1 Sep. 17, 2015

Related U.S. Application Data

(63) Continuation-in-part of application No. 14/216,102, filed on Mar. 17, 2014.

(60) Provisional application No. 61/789,496, filed on Mar. 15, 2013, provisional application No. 61/993,349, filed on May 15, 2014.

(51) Int. Cl.
*G07C 9/00* (2006.01)
*E05F 15/77* (2015.01)
*G06F 3/0482* (2013.01)

(52) U.S. Cl.
CPC ........... *G07C 9/00126* (2013.01); *E05F 15/77* (2015.01); *G06F 3/0482* (2013.01); *E05Y 2400/30* (2013.01)

(58) Field of Classification Search
CPC ............. G07C 9/00309; G07C 9/00111; G07C 2009/00793; G07C 9/00103; G07C 9/00182; G07C 9/0571; G07C 2009/00928

USPC ........................................................ 340/5.7
See application file for complete search history.

(56) References Cited

U.S. PATENT DOCUMENTS

| | | | |
|---|---|---|---|
| 8,395,503 B2 | 3/2013 | Clough | |
| 8,405,337 B2 | 3/2013 | Gebhart et al. | |
| 8,587,404 B2 | 11/2013 | Laird | |
| 2009/0216485 A1 | 8/2009 | Smith | |
| 2010/0242369 A1* | 9/2010 | Laird | E05F 15/684 49/358 |
| 2013/0186001 A1 | 7/2013 | Cui et al. | |

(Continued)

FOREIGN PATENT DOCUMENTS

| DE | 102011082859 A1 | 3/2013 |
|---|---|---|
| KR | 20110006117 A | 1/2011 |

*Primary Examiner* — Mark Blouin
(74) *Attorney, Agent, or Firm* — DeLio, Peterson & Curcio, LLC; David R. Pegnataro

(57) ABSTRACT

A door operator comprises a door driver for opening and closing a door, a controller including a microprocessor connected to and controlling the door driver, a graphical user interface comprising a display screen with touch select input coupled to the microprocessor to display information stored in the controller and to receive instructions selected from the display screen by a user, and a memory module coupled to the microprocessor and storing code executed by the microprocessor. The microprocessor under control of the code displays to the user various menu items on the graphical user interface display and enables the user to select among the menu items using the display screen with touch select input such that the microprocessor derives a control signal. Circuitry is configured to receive the control signal from the microprocessor and to carry the control signal to the door driver.

17 Claims, 9 Drawing Sheets

(56) References Cited

U.S. PATENT DOCUMENTS

| | | |
|---|---|---|
| 2014/0075842 A1 | 3/2014 | McNeill et al. |
| 2014/0182206 A1 | 7/2014 | Yulkowski et al. |
| 2014/0208651 A1 | 7/2014 | Wolfe et al. |
| 2014/0239647 A1 | 8/2014 | Jadallah et al. |
| 2014/0259927 A1* | 9/2014 | McNally, II ............ E05F 15/70 49/13 |
| 2014/0259930 A1 | 9/2014 | Gilliam |

* cited by examiner

CONTROLLER FOR A DOOR OPERATOR

RELATED APPLICATIONS

This application is a continuation-in-part of U.S. patent application Ser. No. 14/216,102 filed on Mar. 17, 2014, which claims the benefit of U.S. Provisional Patent Application No. 61/789,496 filed on Mar. 15, 2013. This application also claims the benefit of U.S. Provisional Patent Application No. 61/993,349 filed on May 15, 2014.

BACKGROUND OF THE INVENTION

1. Field of the Invention

A door operator for a door is described and, more particularly, a door operator including interactive control and monitoring for selectively setting operating parameters of the door.

2. Description of Related Art

The purpose of door operators is to open and close a door. Automatic door operators are used on public buildings and residences to allow for access by the physically disabled or where manual operation of the door may be inconvenient to users. In public facilities, it is a required American National Standard that doors which provide ingress and egress have the ability to open automatically in order to allow handicapped people passage through the doorway.

A variety of electromechanical automatic door operators are known. A typical electromechanical door operator includes an electric motor and a linkage assembly for operatively coupling the drive shaft of the motor to a door so that the door will be opened and closed when the drive shaft rotates. Activation of the door operator is initiated by means of an electric signal generated in a variety of ways such as, for example, a pressure switch, an ultrasonic or photoelectric presence sensor, motion sensors, radio transmitters, wall switches, and the like. The door may then be closed under power or with a door closer. A conventional door closer uses an internal spring mechanism which is compressed during the opening of the door for storing sufficient energy so that the door can be returned to a closed position without the input of additional electrical energy.

In door operators, the automatic, powered opening system and door closer are controlled by switches, sensors and valves. Typically, technicians installing door operators perform set up and adjustment of different parameters. Each time, the technician must gain access to a control board of the door operator, usually by removing a cover or gate operator housing, to make the desired adjustments.

Commissioning and setting door operators and closers is typically done using one or more of the following methods: LED indicators light up and installer waits for button presses to change settings; seven (7) segment displays show a code and installer waits for button presses to change settings that may change the codes on the display (a combination of flashes, alternate lights or colors might be used to indicate progression through menu items or a change in values); a scrolling alphanumeric display; or an alphanumeric display with region buttons or set buttons similar to an MFD (multi-function display) common in military or aviation. As door operators become more capable, powerful and flexible, the ability to manage and update settings within the operator, as well as installation and commissioning, is becoming more complicated.

There is a need for an improved system and method for establishing communication with door operators to initiate their performance and make any desired adjustments. Moreover, it would be advantageous to provide centralized control for setting the door operating parameters.

SUMMARY OF THE INVENTION

Bearing in mind the problems and deficiencies of the prior art, it is therefore an object of the present invention to provide an improved apparatus and method to display, change and interact with settings within and performance of door operators.

It is another object of the present invention to provide an improved apparatus including a graphical user interface with touch capability which can be used to set, adjust, command, test, troubleshoot, configure, upgrade, or monitor settings within and performance of door operators or closers.

A further object of the invention is to provide an improved apparatus including a graphical user interface with touch capability which can be used on any door operator or closer that requires input from a user for adjusting settings or commissioning the unit.

It is yet another object of the present invention to provide an improved apparatus including a graphical user interface with touch capability which allows for a logical menu structure that can access specific values without previous knowledge within a door operator or closer.

Still other objects and advantages of the invention will in part be obvious and will in part be apparent from the specification.

The above and other objects, which will be apparent to those skilled in the art, are achieved in the present invention which is directed to an apparatus for enabling a user to communicate with a door operator. The communicating apparatus comprises a base unit connected to the door operator, the base unit including a processor, a display coupled to the processor to display information to the user under control of the processor, a user input device coupled to the processor to allow the processor to read the state of the input device being selected by the user, and a memory module coupled to the processor, the memory module storing code executed by the processor. The processor under control of the code displays to the user various menu items on the display, enables the user to scroll among the menu items to point to one of the menu items using the input device, and enables the user to select the menu item that is pointed to by using the input device such that the processor derives a control signal. A circuitry is configured to receive the control signal from the processor and to carry the control signal to the door operator.

A method is also provided for a user to communicate with a door operator for controlling a door through a user input. The method comprises the steps of connecting a communicating apparatus to the door for the user to communicate with the door operator, receiving a command signal from the user, deriving a control signal from the command signal, and sending the control signal to the door operator to control a parameter of door movement.

In another aspect, a monitoring device provides for a user to communicate with a door operator through a user input. The monitoring device comprises an interface to connect the monitoring device to the door operator, a circuitry configured to receive a command signal from the user, a controller for deriving a control signal from the command signal, and a display configured to present the data in a graphical and alphanumeric format. The data comprises a set of information from a sensor connected to the door operator.

In still another aspect, the present invention is directed to a door operator comprising a door driver for opening and closing a door, a controller including a microprocessor connected to and controlling the door driver, and a graphical user interface comprising a display screen with touch select input coupled to the microprocessor to display information stored in the controller and to receive instructions selected from the display screen by a user. The door operator includes a memory module coupled to the microprocessor and storing code executed by the microprocessor, wherein the microprocessor under control of the code displays to the user various menu items on the graphical user interface display and enables the user to select among the menu items using the display screen with touch select input such that the microprocessor derives a control signal. The door operator further includes circuitry configured to receive the control signal from the microprocessor and to carry the control signal to the door driver.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-7 of the drawings in which like numerals refer to like features of the invention.

Certain terminology is used herein for convenience only and is not to be taken as a limitation on the invention. For example, words such as "upper," "lower," "left," "right," "horizontal," "vertical," "upward," and "downward" merely describe the configuration shown in the FIGS. Indeed, the referenced components may be oriented in any direction and the terminology, therefore, should be understood as encompassing such variations unless specified otherwise.

As used herein, the term "open position" for a door means a door position other than a closed position, including any position between the closed position and a fully-open position as limited only by structure around the door frame, which can be up to 180 degrees from the closed position.

Figure 1:
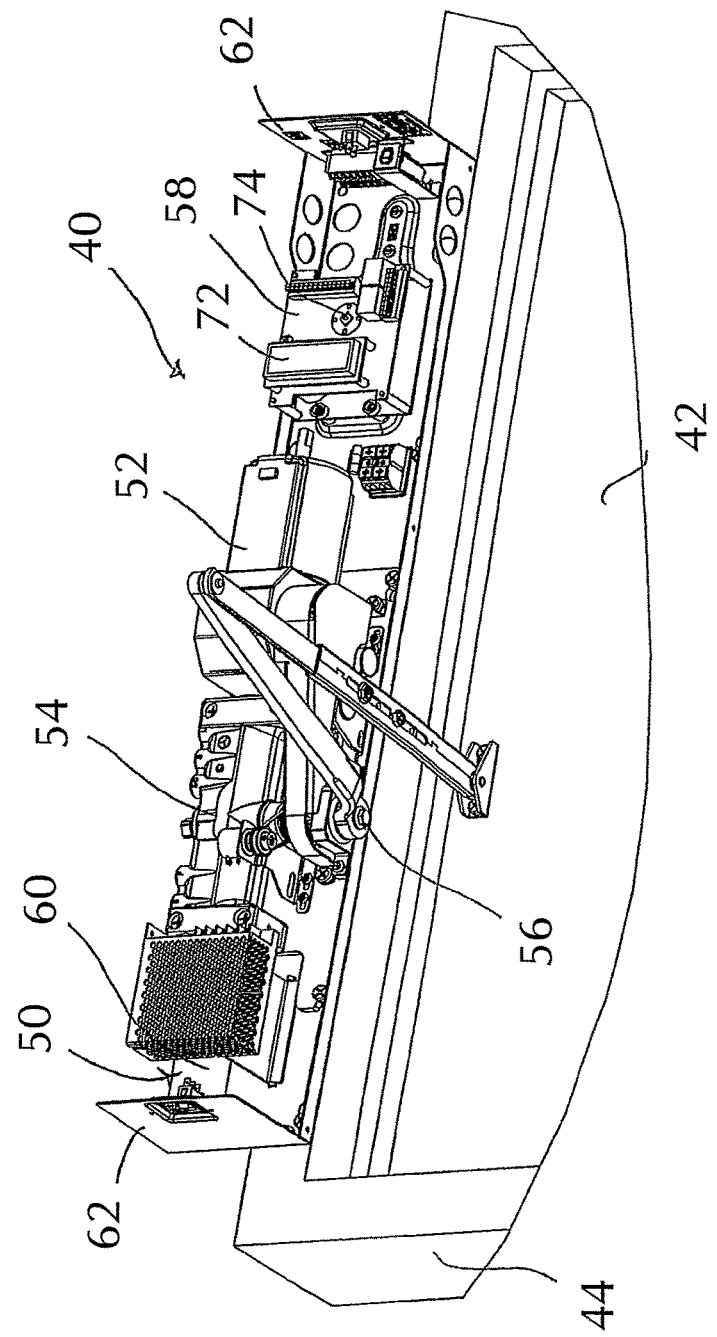
FIG. 1 is a perspective view of an embodiment of a push-side mounted door operator.
Figure 2:
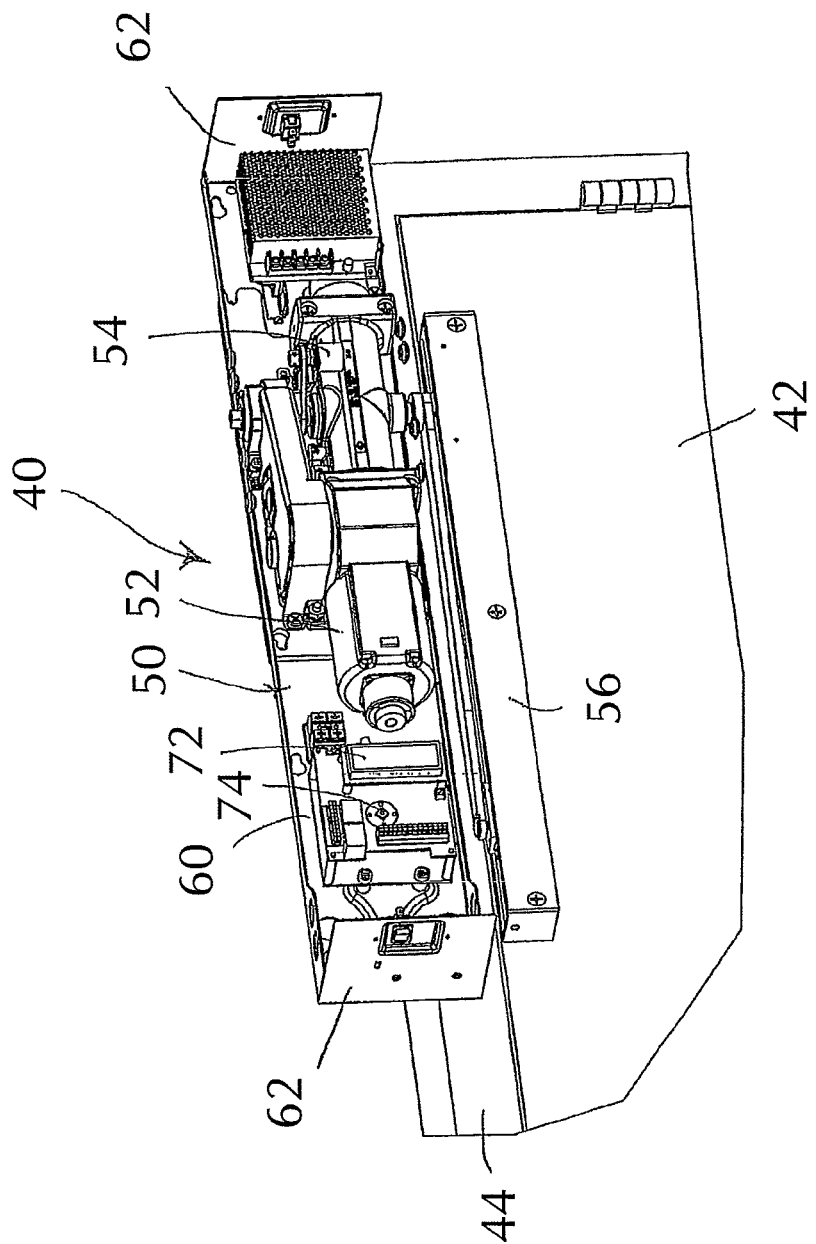
FIG. 2 is a perspective view of an embodiment of a pull-side mounted door operator.

Referring now to the drawings, wherein like reference numerals designate corresponding or similar elements throughout the several views, a door operator according to the present invention is shown in FIG. 1 and generally designated at 40. The door operator 40 is mounted adjacent to a door 42 in a doorframe 44 for movement of the door 42 relative to the frame 44 between a closed position and an open position. For the purpose of this description, only the upper portion of the door 42 and the door frame 44 are shown. The door 42 is of a conventional type and is pivotally mounted to the frame 44 for movement from the closed position, as shown in FIG. 1, to an open position for opening and closing an opening through a building wall 48 to allow a user to travel from one side of the wall 48 to the other side of the wall 48.

The door operator 40 comprises a back plate 50, a motor assembly 52, a door closer assembly 54 including a linkage assembly 56 for operably coupling the door operator 40 to the door 42, and a controller 58. The back plate 50 has substantially flat rear wall 60 and end walls 62. The back plate 50 is securely mounted to the upper edge of door frame 44 using mounting bolts (not shown), or other fasteners. The back plate 50 extends generally horizontally with respect to the door frame 44. The motor assembly 52, door closer assembly 54, and controller 58 are fixed to the back plate 50. A cover (not shown) attaches to the back plate 50. The cover serves to surround and enclose the components of the door operator 40 to reduce dirt and dust contamination, and to provide a more aesthetically pleasing appearance. It is understood that although back plate 50 is shown mounted directly to the door frame 44, the back plate 50 could be mounted to wall 48 adjacent the door frame 44 or concealed within the wall 48 or door frame 44. Concealed door operators are well known in the art of automatic door operators.

A system and method is provided for sending and receiving information to and from the door operator 50 to allow for controlling, monitoring and adjusting information pertaining to operating parameters of the door operator. The control system assists a user, for example an installer, technician, service man or repair man to set, adjust, command, test, troubleshoot, configure, upgrade or monitor a door operator, as well as any other device connected to the same power grid. It is understood that a door operator can be any system that controls a barrier to entry, an exit, or a view, for example, a door operator, a garage door opener, or the like. The barrier could be a door or window for a small entity, or a gate for a large entity, (i.e., a vehicle) which can swing out, slide open, or even roll upwards. The operator, which moves the barrier or gate from an open position to a closed position, or vice versa, can be manual or automatic.

Figure 3:
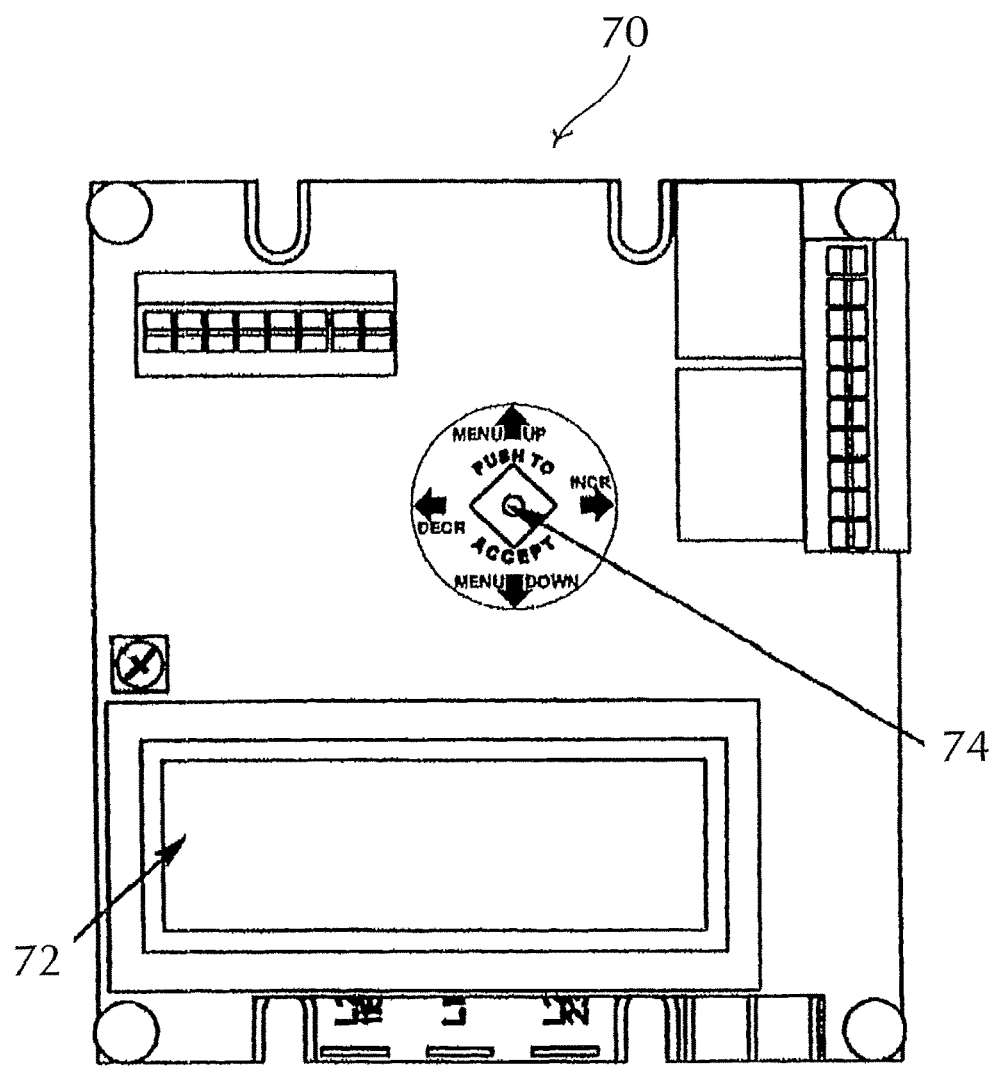
FIG. 3 is a plan view of a controller unit for use with the door operator as shown in FIGS. 1 and 2.

Referring to FIG. 3, a controller unit 70 comprises a processor, e.g. a microprocessor or a microcontroller, with memory for storing instructions and data. Some of the memory is non-volatile, storing configuration information and program code. An LCD display screen 72 of the controller 70 displays various menus, icons, and other information to the user under direction of the processor. The display screen 72 displays information received or stored in the controller. Of course, any type of display may be implemented without departing from the scope of the present invention. In one embodiment, the display screen 72 is self-illuminating to assist in dark work environments. The user can scroll through the menus and icons using an input device, for example, a joystick 74, which may include an internal push-to-activate switch. The processor is connected to the input device so that it can read the status of the input device. Moving the joystick 74 instructs the processor to cause the display to scroll through the menus. Pushing on the joystick 74 with an internal push-to-activate switch instructs the processor that the current menu items have been selected by the user.

Like door operators, the controller 70 may derive power from the power grid. However, the controller 70 may also be battery-operated in case that a power failure occurs or is not plugged into a power source when using both sources of power. In an exemplary embodiment, the controller 70 comprises a rechargeable battery so that the device may be operated without the need for a separate power source. In another embodiment, the controller 70 also comprises a power cord that may be extended from the controller to access any available power grid. A power grid interface derives power from a power line and in turn supplies current to both the power supply and other circuitry. The power supply feeds power to various components of the monitoring device including the rechargeable battery and CPU.

The display screen 72 is configured to present data in a graphical and alphanumerical format. In an exemplary embodiment, the controller 70 is capable of providing graphical and numerical depictions of the internal parameters of the door operator. The CPU communicates with the controller 70 to send information to the display screen 72. In another embodiment the controller 70 uses a combination of graphical representations, text messages, and light indicators to represent data. In another embodiment, text messages on the screen 72 inform the user of real time events as they occur. In yet another embodiment, the controller 70 may comprise light indicators that light up when a particular event takes place. The graphical or text representations will allow the technician to adjust or set the parameters. This is desirable in the industry as many users have different requirements for the use of their doors and technicians are required to make adjustments.

The input interface, along with joystick 74 control combined with internal components, such as a CPU and a memory, allow a user implementing the control system to receive, process, and send information. In use, setup and adjustment of the inverter and door operator are performed with the joystick 74. The LCD screen 72 shows the feature to be adjusted and the setting. A small potentiometer ("pot") beside the LCD interface can be used to adjust the LCD screen contrast. To scroll through menu items, the joystick is moved toward "MENU↑UP" to scroll up or toward "MENU↓DOWN" to scroll down. To change the value of a feature, the joystick is moved toward "INCR→" to increase the value or toward "←DECR" to decrease the value. To accept the value, the joystick is pushed inwardly. Once setup or adjustment of the desired features is completed, the joystick is used to scroll down the menu to the "SAVE" line, and the joystick is pushed in to accept all of the values.

Some of the features that may be set and adjusted include hand of the door, whether left hand or right hand mounted. The mounting of the door is also designated as a push or pull, depending on the side of the door on which the unit is mounted. There is a "Push N Go" feature, which may be on or off. If "off," the unit depends on an external switch for activation. If "on," the unit will operate with a slight movement of the door toward the open position. Even if "on," external switches may also be used for activation.

Obstruction detection and delay sensitivity may be adjusted. The range of delay may be about 0 to about 5 seconds and adjustable in 1 second increments. During the opening cycle, the door will press against an obstruction for the obstruction delay time set and then close normally under spring force. During the closing cycle, the door will press against an obstruction for the time set under a feature entitled "Hold Time." The door will then reclose. If the obstruction is still present, power to the unit will turn off with only the spring force pushing the door against the obstruction.

A "Latch Boost" feature can be adjusted to "Off," "Low," or "High." For example, if during the last few inches of door closing, the door does not close due to mechanical door issues, environment issues and the like, additional force can be added to close the door.

The time the door is held at the fully open position can be adjusted from about 0 to about 30 seconds in, for example, 3 second increments. A delay to the motor start can be set in 1 second increments from, for example, about 0 to about 5 seconds before the unit starts to allow unlocking of electric hardware, The length of time a relay will stay energized for powered latch retraction can be adjusted, for example, in 3 second increments, from about 0 to about 30 seconds. Alarm Delay can be "Off" or set, for example, at about 30 seconds, about 60 seconds, and the like.

A number of items may be recorded and tracked. The number of open/close cycles the unit has experienced can be recorded. The number of days the unit has been powered to 120 VAC can be recorded. The time for the previous opening cycle and the previous closing cycle can also be recorded. Information regarding specific users of the door can also be recorded, such as RFID (radio frequency identification) tag scan frequency. The control unit can be used to set the closed and open position of the door. Again, once all adjustments have been made, the joystick is pushed in to save the values.

Figure 4A:
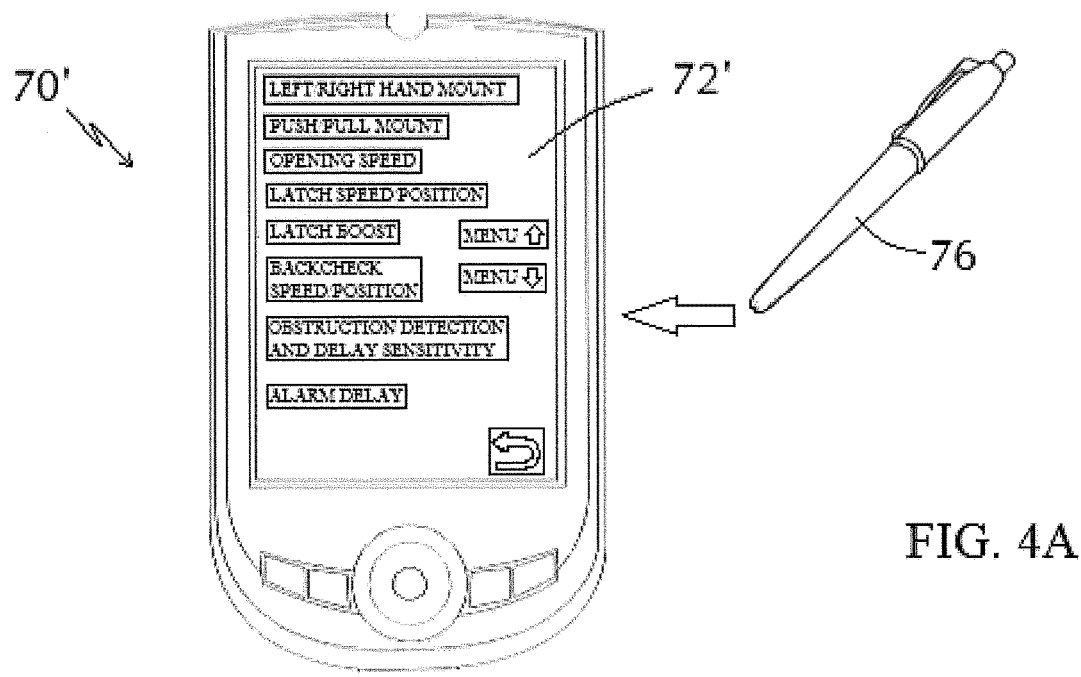
FIGS. 4A-4C are plan views of an embodiment of the present invention wherein a remote controller is built into a personal digital assistant (PDA) loaded with special purpose code.
Figure 4B:
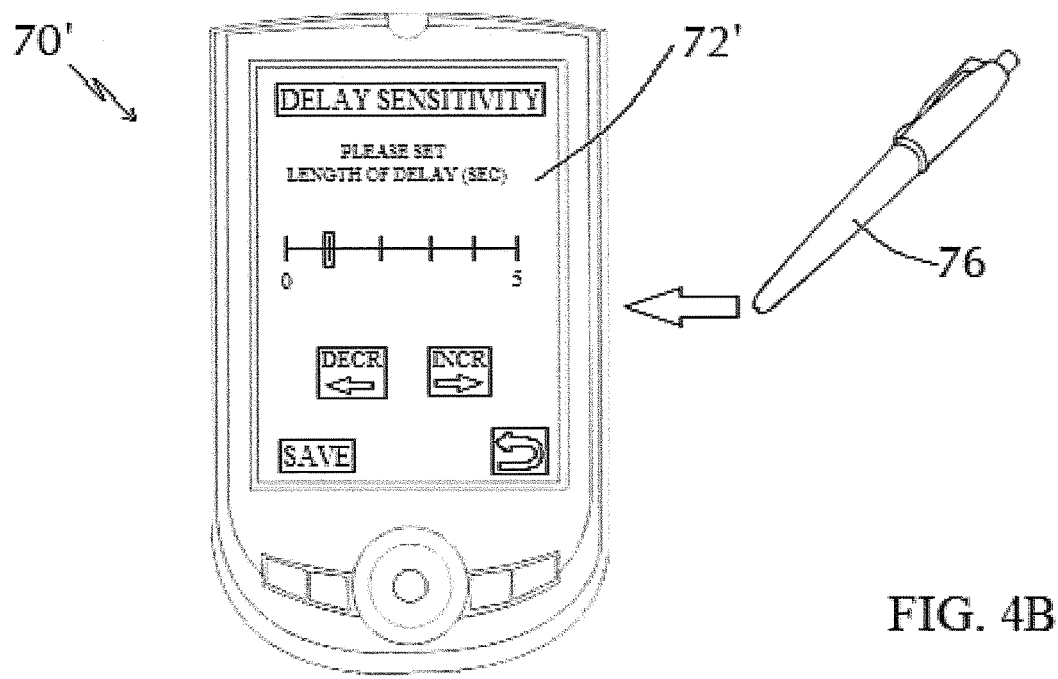
Figure 4C:
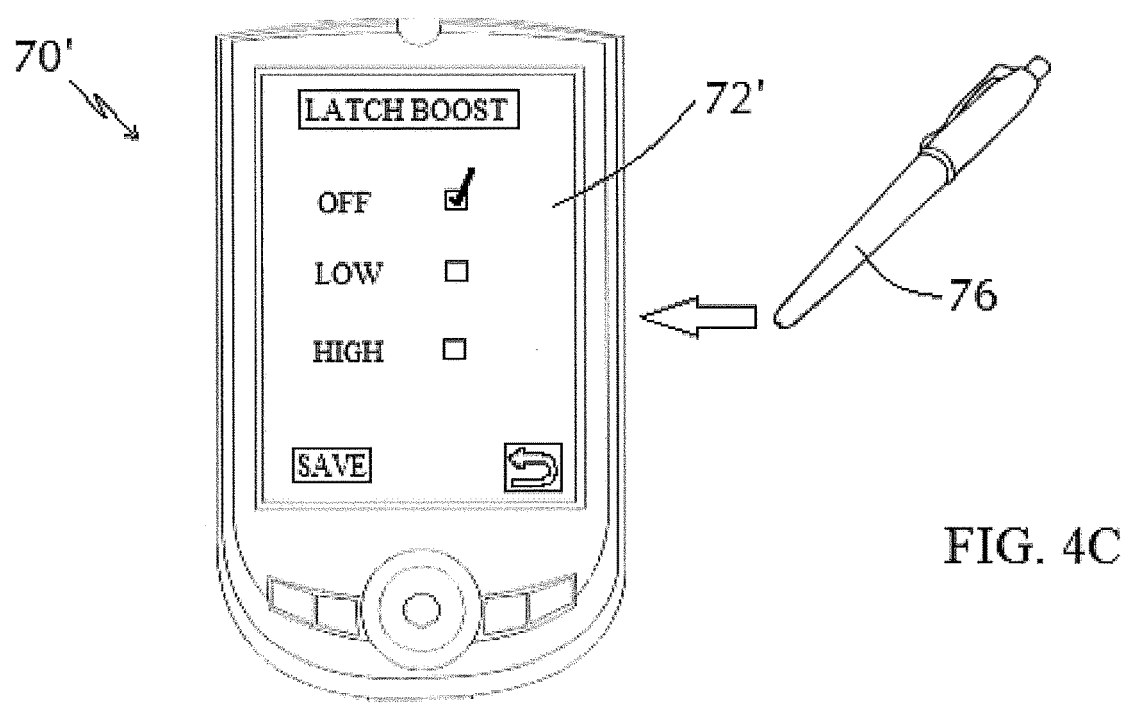

As shown in FIGS. 4A-4C, in one embodiment, a remote controller 70' is built into a personal digital assistant (PDA) loaded with and executing special-purpose code. An RF (or other wireless) communication card plugs into a port of the PDA and performs wireless communication functions under control of the PDA. The screen of the PDA acts as the display of the remote controller, and the manual input devices of the PDA—a keyboard or stylus-like pen 76—is used to scroll and select the menu items. The stylus-like pen 76 may select a desired menu item by contacting the PDA screen and touching the menu item. The PDA can also provide electrical power to the RF communication card.

As depicted in FIG. 4A, the display screen 72' shows menu items corresponding to parameters to be performed by the door operator. Each menu item is represented on the display screen 72' by an icon or button. The user may use a stylus-like pen 76 to select the desired parameter to be adjusted by contacting the tip of the stylus pen against the display screen and pressing on the icon corresponding to the desired parameter. If the desired parameter is not listed, the user may press the "MENU↑UP" or "MENU↓DOWN" icon or button to view more options. A "BACK" or "⊃" icon or button will return the user to the previous screen.

The user may select, for example, the obstruction detection and delay sensitivity setting, as shown in FIG. 4B. The range of delay may be about 0 to about 5 seconds and adjustable in 1 second increments, as shown on display screen 72'. The user may again use stylus pen 76 to adjust the range of delay by touching the stylus pen against the display screen and sliding the toggle to the desired value, or alternatively, by pressing the "INCR→" or "←DECR" icon or button to increase or decrease the value. Once setup or adjustment of the desired feature is completed, the user may press inwardly on the "SAVE" icon or button using the stylus pen 76 to accept the values. The display screen 72' is capable of displaying information received or stored in the controller in various graphical representations, including alphanumeric characters, symbols, still images, videos, or animated graphics, such as 'check' boxes to adjust the "Latch Boost" feature. As shown in FIG. 4C, when contacting the tip of stylus pen 76 against the display screen touch interface in the desired 'check' box, individual pixels in the display illuminate to depict a 'check' mark graphic in the box next to the selected setting.

In another embodiment, the remote controller includes a port for downloading software, icon and/or other control, data for use by the remote controller in the course of operating its controlled systems. The data enables the remote controller, for example, to operate additional controlled systems, and to display new icons.

In one embodiment, the controller can be uploaded with an installation manual accessible to a technician for review. For example, and without limiting the scope of the description, an installation manual for a door operator may be displayed for a technician while working with the unit in the field. This information may be desirable during installation, maintenance, or adjustment of gate operators. Additionally, the controller may comprise a USB interface which may be used to upload or upgrade firmware for the controller. Further, a serial port interface provides yet another connectivity option for the controller to hook up to other devices for the transfer of communication.

Figure 5:
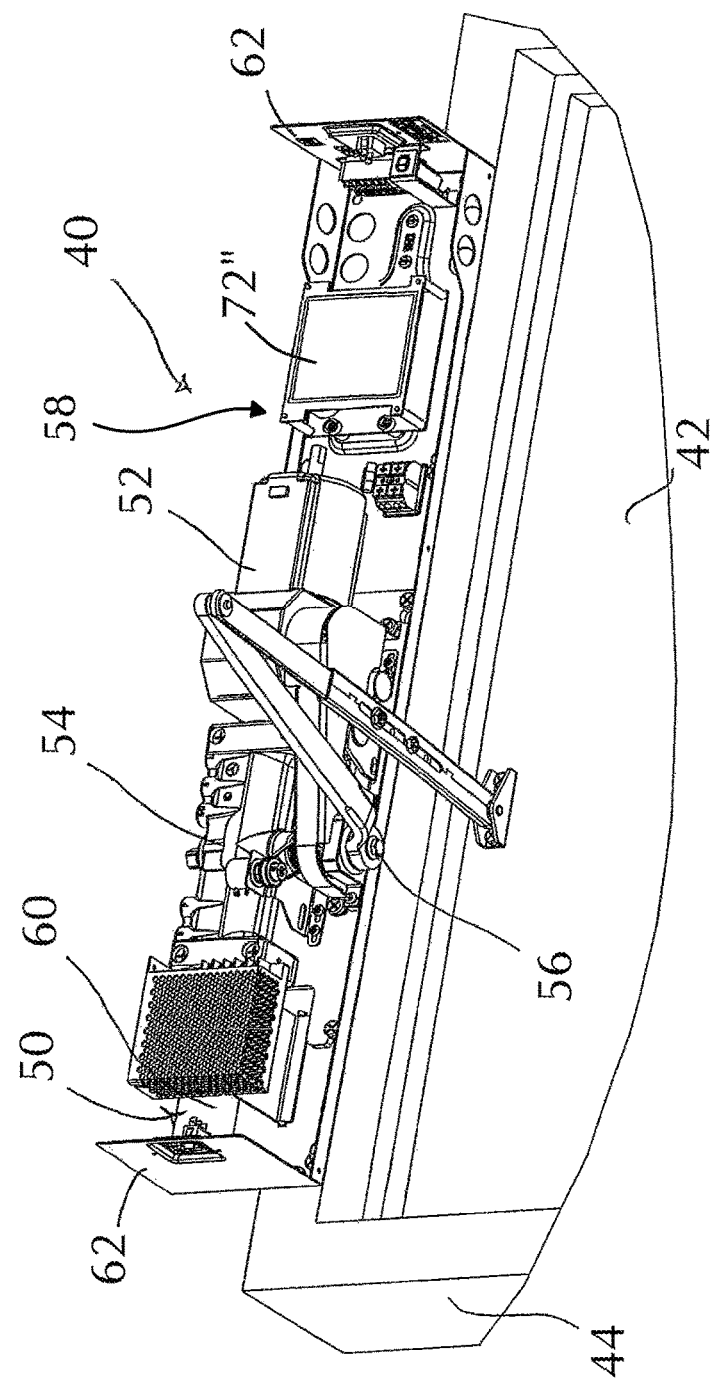
FIG. 5 is a perspective view of another embodiment of a push-side mounted door operator, wherein the door operator includes a display screen comprising a graphical user interface with a planar touch select interface.

In yet another embodiment, a graphical user interface ("GUI") comprising a pixel display screen 72" capable of graphics and augmented with a planar touch select overlay is connected to the processor, e.g. a microprocessor or microcontroller, which controls movement of the door, wherein the GUI is coupled to the controller and the display screen with touch select overlay is the user input device. The pixel display screen 72" may be embedded in a door operator during production and hidden under a cover (not shown) which serves to surround and enclose the components of the door operator, as shown in FIG. 5. In such a configuration, an installer or technician would need to remove the door operator's cover or housing to access the GUI. Alternatively, the pixel display screen may be positioned outside and adjacent to the door operator housing, such as on the same or an adjacent wall. To prevent unauthorized access to the unit, the GUI may require the input of a preregistered security code by an authorized user. The planar touch interface may employ any type of touch array, such as a capacitive and/or resistive touch array. The GUI is pixel-controlled and control software can light (or dim) or change the color of individual pixels to display still images or alphanumeric characters or symbols, as well as display videos or animated graphics. The pixel display may be LCD, LED or any other technology. An advantage of a pixel-controlled display is that the display is not limited to a linear menu structure, and instead may be configured as an applications ("apps") panel similar to a smartphone screen display. Activating an icon or button on a given screen using a user's fingers (or other touch-enabled interface) causes the display to change, such as going from a "start menu" to a subsequent screen to adjust a particular operating parameter setting.

A memory module coupled to the processor stores code executed by the processor. Any information with respect to the door operator which is stored in the memory module, such as a preloaded installation instruction manual, an activation or setup wizard, or installation and/or troubleshooting videos, may be displayed on the GUI display screen 72" to assist the user. For example, if an installer or technician needs assistance in connecting a presence sensor while in the field, the technician may use the display screen's touch select interface to navigate the GUI to select a preloaded instructional video, which can then be viewed on the display.

The memory module may include code comprising a self-diagnostic test of the door operator's operating parameters and internal circuitry, which can be performed by the processor. The processor sends a plurality of control signals to the door driver corresponding to designated parameters of door movement, the control signals are sent through the circuitry of the door operator, and the processor then receives data from the door driver responsive to the plurality of control signals. After selection by an installer or technician of the diagnostic test icon or button on the GUI display screen 72", the system is capable of performing a self-test to diagnose and analyze whether the parameters of the door are performing correctly, displaying the results to the user on the GUI display, and providing instructions to the user as to suggested fixes, if any, for incorrectly performing parameters or circuitry. Suggested fixes may include jumping a connector or similar and completing the self-test to diagnose circuits that are not operating properly. The controller system allows for both self- and user-interactive analytics and diagnostics of the door operator.

Figure 6:
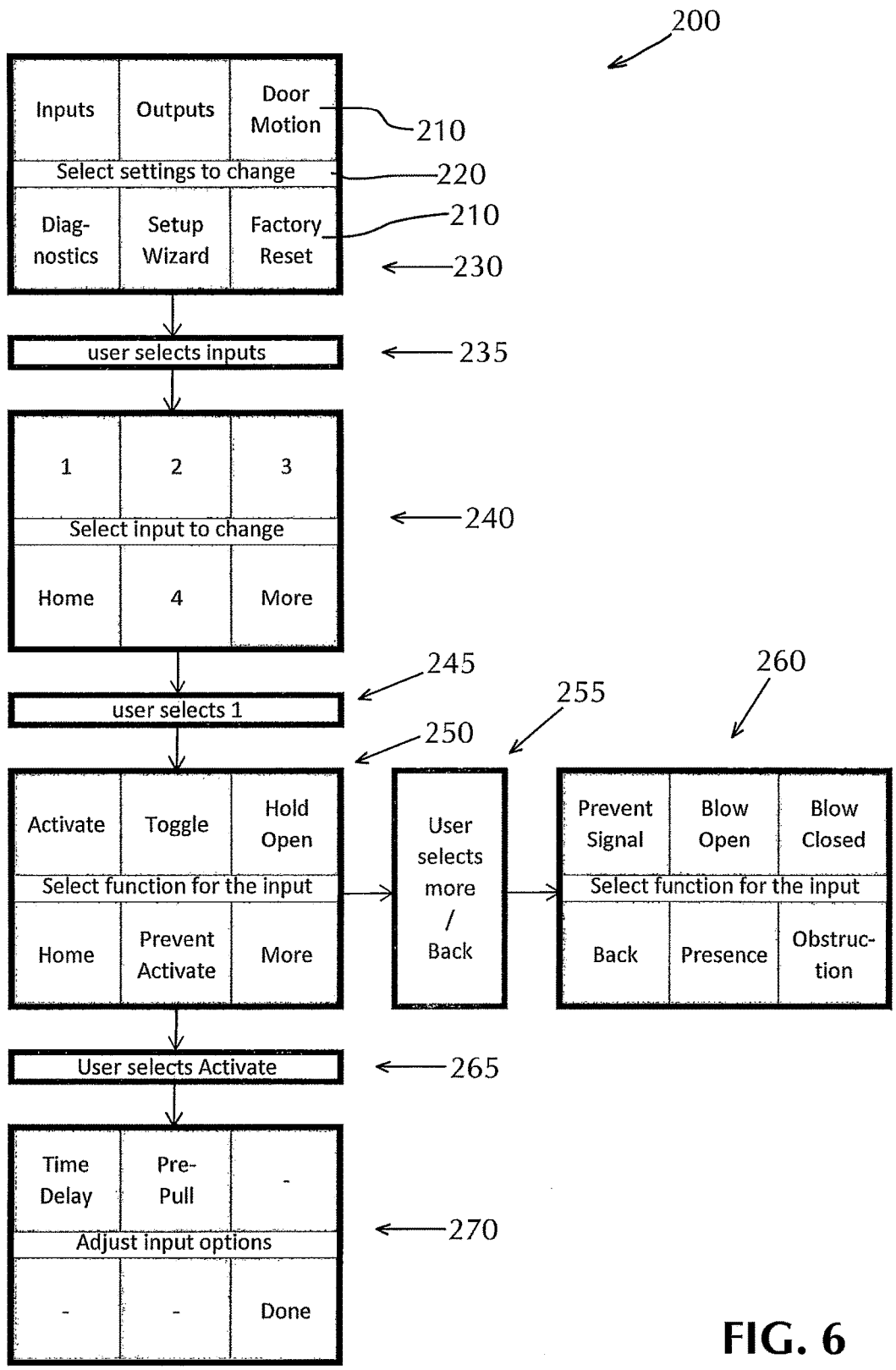
FIG. 6 is a flow diagram of one embodiment of the graphical user interface for use with a door operator as shown in FIG. 5.

FIG. 6 provides an exemplary GUI which allows a user, installer, technician or the like, to set, adjust, troubleshoot, configure, or monitor settings within a door operator. The example is a flow of screens visible on the GUI to the user with soft icons or buttons to change settings for the inputs/outputs, input/output device numbers, functions and activations, with each selection dropping into a settings screen. In one embodiment, the GUI screen 200 may be comprised of separate blocks of options with soft icons or buttons 210 and a scrolling text bar 220 in the middle. In an initial block of buttons 230, the user may select basic door operation parameters such as door motion settings, diagnostics, setup wizard or factory reset of all settings. The user may also select whether to use the control system of the present invention to set up any additional door operator input or output functions such as a wall switch, presence sensor, or any other input or output including but not limited to those described herein. After selecting on block 230 whether to adjust an input or output, e.g. selecting input 235, the user then selects on block 240 the particular input or output to change, that is, the input or output to which the device is connected, e.g., as device No. 1, 245. The user then selects on block 250 the particular function for the input and, if the function is not shown, selects "More" 255, after which additional function blocks 260 are displayed. If, for example, "Activate" is selected 265, the user is then presented with the settings block 270 for that function, and the particular settings options are presented and the user may select and change those settings by subsequent setting screens. The GUI shows and identifies to the controller the selected door operator input or output and corresponding microprocessor input or output to the program module corresponding to the selected function to be performed.

Figure 7:
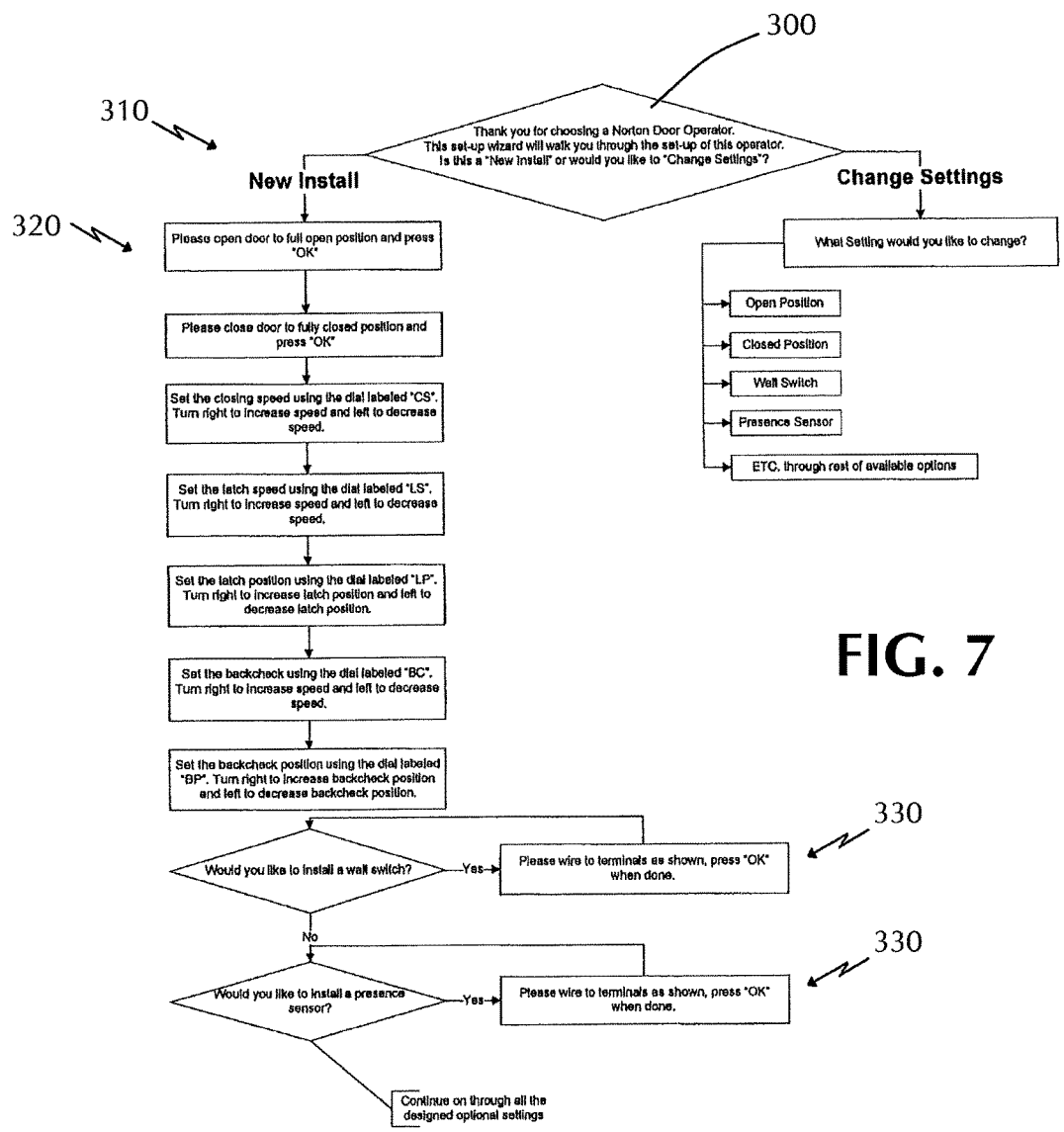
FIG. 7 is a flow diagram of an exemplary activation wizard displayed on the graphical user interface display screen for use with a door operator as shown in FIGS. 5 and 6.

FIG. 7 provides a flowchart of an exemplary activation wizard displayed on the GUI display screen. The example is a progression of steps taken in either a new installation of a door operator or in changing one or more operating parameter settings in an existing setup. A user is greeted with a startup screen 300 allowing the user to select, for example, a "New Install" or to "Change Settings" using the GUI's planar touch interface. After selecting an icon or button 310, for example, for "New Install," the user is walked through a series of instructions 320 for set-up of the door operator, with each set of instructions or steps displayed on a subsequent screen. In conjunction with each instruction, the GUI may display graphical representations or images to assist the user in performing the desired calibration, such as displaying an image of a dial to allow the user to adjust the opening or closing speed of the door driver. Other settings which may be set or adjusted using the GUI include but are not limited to obstruction detection and delay sensitivity, latch speed and position, backcheck speed and position, and latch boost.

The GUI may also be used to instruct the user on how to install additional optional door operator input or output functions, such as a wall switch or presence sensor. In at least one embodiment, the GUI is configured to display an instruction video or animated graphic 330 to assist the user in performing the instructed operation, such as wiring a wall switch or presence sensor to the appropriate terminals.

The controller has many advantages, including providing installers and manufacturers with a means to set, adjust, command, test, troubleshoot, configure, upgrade, or monitor door operators.

Although the controller has been shown and described in considerable detail with respect to only a few exemplary embodiments thereof, it should be understood by those skilled in the art that it is not intended to limit the invention to the embodiments since various modifications, omissions and additions may be made to the disclosed embodiments without materially departing from the novel teachings and advantages of the controller, particularly in light of the foregoing teachings. Accordingly, it is intended to cover all such modifications, omissions, additions, and equivalents as may be included within the spirit and scope of the description of the controller invention as defined by the following claims. In the claims, means-plus-function clauses are intended to cover the structures described herein as performing the recited function and not only structural equivalents but also equivalent structures. Thus, although a nail and screw may not be structural equivalents, in that a nail employs a cylindrical surface to secure wooden arts together, whereas a screw employs a helical surface, in the environment of fastening wooden parts, a nail and screw may be equivalent structures.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A door operator, comprising:
   a door driver for opening and closing a door;
   a controller including a microprocessor, the microprocessor connected to and controlling the door driver;
   a graphical user interface embedded in the door operator comprising a display screen with touch select input coupled to the microprocessor to display information stored in the controller and to allow the microprocessor to receive instructions selected from the display screen by a user;
   a memory module coupled to the microprocessor, the memory module storing code executed by the microprocessor,
   wherein the microprocessor under control of the code displays to the user various menu items on the graphical user interface display and enables the user to select among the menu items using the display screen with touch select input such that the microprocessor derives a control signal; and
   circuitry configured to receive the control signal from the microprocessor and to carry the control signal to the door driver.

2. The door operator of claim 1 wherein the display screen with touch select input comprises a resistive touch array.

3. The door operator of claim 1 wherein the display screen with touch select input comprises a capacitive touch array.

4. The door operator of claim 1 wherein the graphical user interface display is pixel-controlled.

5. The door operator of claim 4 wherein the graphical user interface display is configured to illuminate individual pixels to display the information, the display capable of a representation selected from a group comprising alphanumeric characters, symbols, still images, videos, or animated graphics.

6. The door operator of claim 1 wherein each of the menu items corresponds to at least one operating parameter of a plurality of operating parameters to be performed by the door operator.

7. The door operator of claim 1 wherein the memory module includes code comprising a preloaded installation instruction manual, an activation wizard, at least one installation video, and at least one troubleshooting video.

8. The door operator of claim 1 further comprising an internal storage for recording and tracking data sent to or received from the door operator.

9. The door operator of claim 1 wherein the graphical user interface requires the input of a preregistered security code by the user to prevent unauthorized access.

10. The door operator of claim 1 further comprising a sensor connected to a door, wherein the controller receives a response signal from the door carrying data from the sensor responsive to the control signal to the door operator.

11. The door operator of claim 10 wherein the data comprises a door position.

12. The door operator of claim 1 wherein the memory module includes code comprising a diagnostic test, and wherein the microprocessor is capable of diagnosing and analyzing an operation of the door.

13. A method of adjusting parameters within a door operator, comprising the steps of:
    providing a door operator comprising,
       a door driver for opening and closing a door,
       a controller including a microprocessor, the microprocessor connected to and controlling the door driver,
       a graphical user interface embedded in the door operator comprising a display screen with touch select input coupled to the microprocessor to display information stored in the controller and to receive instructions selected from the display screen by a user,
       a memory module coupled to the microprocessor, the memory module storing code executed by the microprocessor, and
       circuitry configured to receive the control signal from the microprocessor and to carry the control signal to the door driver;
    displaying to the user on the display screen menu items corresponding to parameters to be performed by the door operator;
    selecting among the menu items by touching a menu item on the display screen, such that the microprocessor derives a control signal; and sending the control signal to the door driver to control a parameter of door movement.

14. The method of claim 13 further comprising a sensor connected to the door operator, wherein a response signal from the door operator comprises a signal from the sensor.

15. The method of claim 13 further comprising the step of monitoring a door that is connected to the door operator.

16. The method of claim 13 wherein the microprocessor diagnoses and analyzes an operation of a door that is connected to the door operator.

17. A method of analyzing and diagnosing an operation of a door that is connected to a door operator, comprising the steps of:
   providing a door operator comprising,
      a door driver for opening and closing a door,
      a controller including a microprocessor, the microprocessor connected to and controlling the door driver,
      a graphical user interface embedded in the door operator comprising a display screen with touch select input coupled to the microprocessor to display information stored in the controller and to receive instructions selected from the display screen by a user,
      a memory module coupled to the microprocessor, the memory module storing code executed by the microprocessor, the code comprising a self-diagnostic test, and
      circuitry configured to receive at least one control signal from the microprocessor and to carry the at least one control signal to the door driver;
   displaying to the user on the display screen a menu item corresponding to the self-diagnostic test;
   selecting among the menu items by touching the menu item on the display screen corresponding to the self-diagnostic test, such that the microprocessor derives a plurality of control signals;
   sending the plurality of control signals to the door driver to control a plurality of parameters of door movement;
   receiving data from the door driver responsive to the plurality of control signals; and
   displaying to the user on the display screen the data.

* * * * *